Patented Feb. 28, 1933

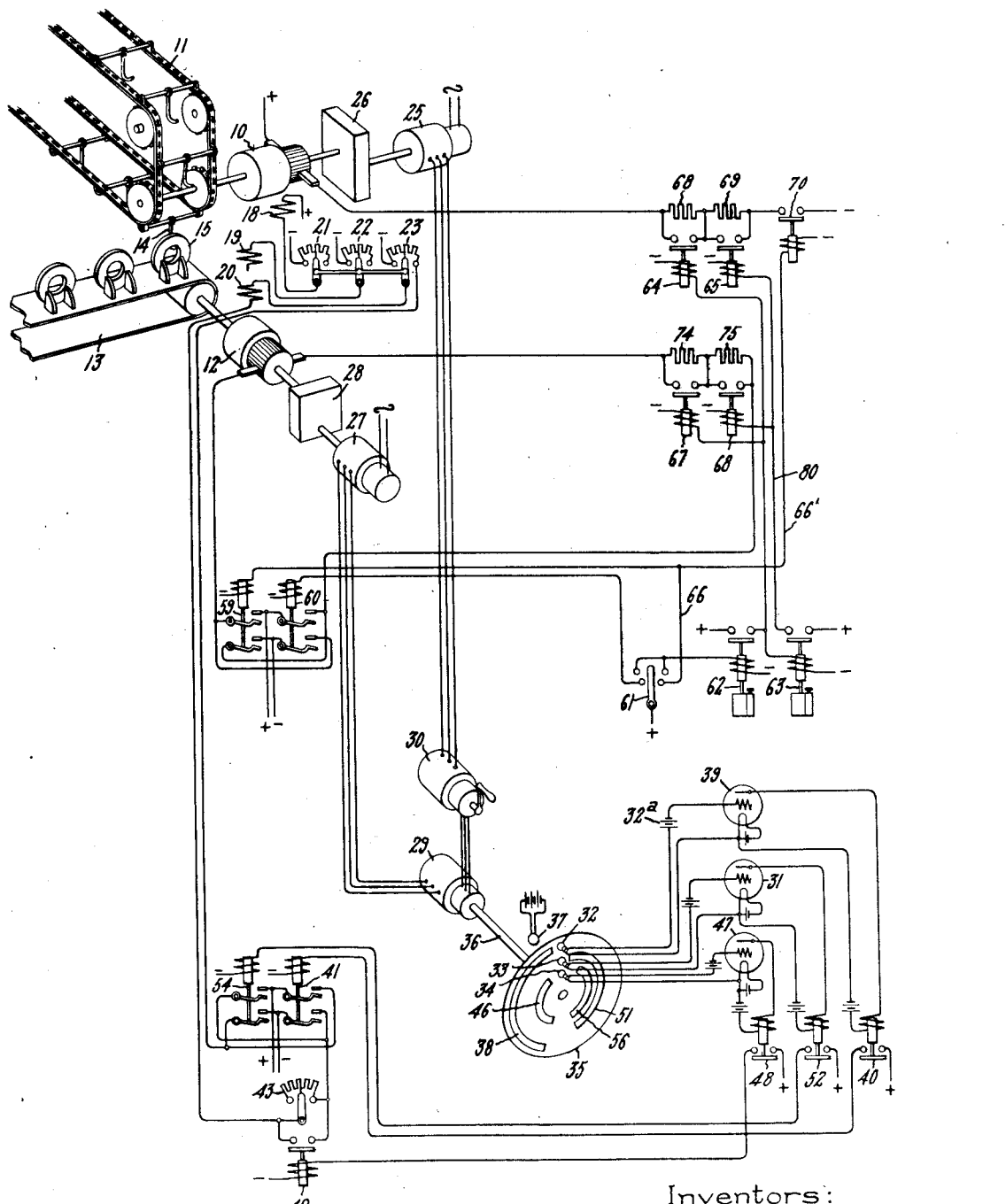

1,899,595

UNITED STATES PATENT OFFICE

WILLIAM B. SNYDER AND DUDLEY E. CHAMBERS, OF SCHENECTADY, NEW YORK, ASSIGNORS TO GENERAL ELECTRIC COMPANY, A CORPORATION OF NEW YORK

CONVEYER SYNCHRONIZING CONTROL

Application filed December 30, 1931. Serial No. 583,900.

Our invention relates to motor control systems applied to the synchronization of two moving elements and more particularly to the synchronization of two conveyers, with respect to speed and with respect to the relative positions occupied by respective points on each of said conveyers.

One application of the principles embodied in our invention is found in a method for increasing the production in a plant such as where a conveyer is utilized to transport material from one point to another and a second conveyer is arranged to receive the material from the first conveyer and to transport it to a different part of the plant. Ordinarily, the two conveyers may be synchronized by gearing them together. However, for applications where it is desired to stop one conveyer and operate the other in a reverse direction, the use of the gearing introduces many problems in repositioning the conveyers with respect to each other. In one application of our invention it was desired to transport coils of wire, rod or the like on one conveyor, and have a second conveyor arranged automatically to load itself with the coils. Inasmuch as the coils are picked up by means of hooks on the second conveyer it will be seen that the two conveyers must be accurately positioned at all times with respect to each other so that each hook will engage itself with a coil. That is to say, the conveyers must at all times be in positional agreement one with the other.

In carrying out our invention in one form thereof, we provide means positionally responsive to the movement of the conveyers and arranged so that the speed of one conveyer is momentarily increased or decreased until the conveyers are brought into positional agreement and are thereafter operated in synchronism with each other. More specifically we employ motion transmitting devices operated by each conveyer so arranged as to control by means of a motion receiving device and light sensitive devices, the speed of one conveyer so that given points on each conveyer are brought into and maintained in correspondence with each other.

For a more detailed description of our invention, reference should now be had to the accompanying drawing in which we have diagrammatically illustrated our invention as applied to a hook conveyer and to a pin conveyer.

Referring to the drawing we have shown our invention in one form as applied to the control of a direct current motor 10 arranged to drive the hook conveyer 11, and to a motor 12 arranged to drive the pin conveyer 13. It will be observed that a hook 14 is shown in engagement with a coil 15 and illustrates the manner in which the coil 15 is transferred from the pin conveyer 13 to the hook conveyer 11. The field excitation for the motor 10 is provided by a separately excited field winding 18, while a separately excited field winding 19 and an auxiliary corrective field winding 20 serve to provide excitation for the motor 12. There is connected respectively in series with each of the respective field windings 18, 19 and 20, a corresponding field rheostat 21, 22 and 23. These speed controlling rheostats are mechanically connected together so that when the resistance of one rheostat is varied the resistance of each of the other rheostats is varied by a proportionate amount.

In order to obtain an electrical indication of the position of the conveyer 11 while it is in operation, a motion transmitting device 25 is provided which device is driven through a gear box 26 by the motor 10. Similarly, a second motion transmitting device 27 is driven through a gear box 28 by the motor 12. A differential motion receiving device 29 is electrically connected to the motion transmitting devices 25 and 27 so that the rotor of the motion receiving device 29 is actuated in accordance with any positional disagreement which may exist between the conveyer 11 and the conveyer 13.

Inasmuch as there may at times be a certain amount of play between the various conveyer elements, we have provided a corrective device 30 in the circuit of the differential motion receiving device 29. The corrective device 30 serves to vary electrically the neutral point of the device 29.

Motion transmitting devices of the type shown are now being sold under the trade name "Selsyn". These devices are described in U. S. Patent No. 1,637,039 to Hewlett et al. and in this description they will be described by saying that the devices 25 and 27 have poly-circuit stator windings with single circuit rotor windings. The differential device 29 has a poly-circuit rotor winding as well as a poly-circuit stator winding. The corrective device 30 is similar in construction to the differential device.

The gear ratio of the gears (not shown) contained in gear boxes 26 and 28 is such that the respective rotors of the transmitting devices 25 and 27 are rotated through 360 degrees for every length between adjacent hooks, and between adjacent pins of the respective conveyers. In one installation this distance was equal to ten feet; therefore the motion transmitting devices 25 and 27 were rotated through one revolution for each ten feet of linear travel of a conveyer. The energization of the auxiliary field winding 20 is controlled by means of three light sensitive devices 32, 33 and 34. A disk of light weight material, such as aluminum, is mounted on an extension 36 of the shaft of the differential motion receiving device 29. A light source 37 is arranged to illuminate the side of the disk opposite the light sensitive devices 32, 33 and 34.

If the speed of the pin conveyer 13 should increase and cause the position of the pins to leave their positions with respect to the hooks, the motion receiving device 29 will rotate the disk 35 in a clockwise direction so that the slot 38 provided in the disk 35 permits light to be directed on the light sensitive device 32. The resultant flow of current through the light sensitive device 32 and the bias battery 32a causes a positive potential to be applied on an amplifier 39 so that sufficient current is produced to operate a relay 40. This relay 40 is arranged to complete an energizing circuit for a direction switch 41. The direction switch 41 upon closing completes a circuit for the auxiliary field winding 20 through a field rheostat 43 in a direction to increase the field excitation of the motor 12 thereby slowing down the motor. Should there be considerable disagreement between the position of the pins with respect to the hooks, a slot 46 provided in the disk 35 permits light to be directed on the light sensitive device 34, and by means of an amplifier 47 similar in construction and arrangement to the amplifier 39, a relay 48 is closed to complete an energizing circuit for the relay 49 which operates to short circuit the field rheostat 43. It will thus be seen that the magnetic field produced by the winding 20 is considerably increased so that the motor 12 is slowed down a substantial amount. In other words, we provide for a small corrective effort to be applied to the motor 12, or for a large corrective effort as determined by the extent of the positional disagreement between the conveyers 11 and 13.

If the speed of the conveyer 13 should decrease, the disk 35 is rotated so that the slot 51 permits light to be directed on the light sensitive device 33 which device causes current to flow through an amplifying device 31, thereby closing the relay 52. This relay 52 completes an energizing circuit for a direction switch 54 so that the direction switch applies excitation to the field winding 20 in a direction opposite to the previous case, thereby increasing the speed of the motor 12. Should the disagreement between the position of conveyers 11 and 13 be considerable, a slot 56 is arranged to permit light to be directed on the light sensitive device 34 so that the amplifying device 47 again operates to close the relay 48 which causes the relay 49 to short circuit the field rheostat 43 thereby further increasing the speed of the motor 12.

Inasmuch as it is sometimes necessary to operate the pin conveyer 13 in a reverse direction, the direction switches 59 and 60 are provided for reversing the polarity of current applied to the armature of the motor 12. The energization of the direction switches is controlled by means of a master switch 61. This master switch also serves to control the energization of a pair of time delay relays 62 and 63, which in turn are respectively arranged to complete energizing circuits for the accelerating contactors 64 and 65 provided in the armature circuit of the motor 10, and for the accelerating contactors 67 and 68 connected in the armature circuit of the motor 12.

With the above understanding of the elements and their organization with respect to each other in the system, the operation of the system itself and the manner in which the light sensitive devices 32, 33 and 34, rendered effective by the cooperation of the motion transmitting devices 26 and 27 and the motion receiving device 29, function to maintain the conveyers exactly in positional agreement will be readily understood from the description which follows. It will be assumed that the supply lines are suitably energized as indicated by the well understood symbols for direct and alternating current. In starting up the equipment the master switch 61 is operated to its right-hand position to complete an energizing circuit by means of conductors 66 and 66' for the operating coil of the line contactor 70 connected in circuit with the armature of the motor 10. This contactor immediately operates to energize the motor 10 through the accelerating resistors 68 and 69. At the same time an energizing circuit is completed for the direction switch 60, the operating coil of this direction switch being connected in parallel with the energizing circuit for the line contactor 67. The closing of the direction switch 60 serves to complete an energizing circuit for the armature of the motor 12 so that it rotates in a clockwise direction. A pair of accelerating resistors 74 and 75 are connected in series with the armature of the motor 12 so that the motor only accelerates to a low speed. Inasmuch as an energizing circuit for the time closing accelerating relay 62 is completed as soon as the master switch 61 was operated to its right-hand position, it will be seen that this relay will operate to close its contacts after a predetermined time interval; consequently energizing circuits may be traced for the first accelerating contactor 64 of the motor 10, and for the first accelerating contactor 67 of the motor 12. By connecting both of these accelerating contactors in parallel it will be seen that the acceleration of the motors 10 and 12 occurs at the same time. A predetermined time interval after the accelerating relay 62 closes, the accelerating relay 63 operates to close its contacts thereby completing energizing circuits by means of the conductor 80 for the second accelerating contactors 65 and 68 of the respective motors 10 and 12. The motors 10 and 12 are therefore simultaneously accelerated to their high speed. The speed controlling rheostats 21 and 22 are adjusted until the motors 10 and 12 are operating at desired speeds. At the same time the rheostat 23 is adjusted a corresponding amount so that the corrective effort of the field winding 20 is varied a corresponding amount.

Should a positional disagreement exist, however, between the positions of the pins on the conveyer 13 and the hooks on the conveyer 11, the corrective field 20 will be energized in a direction to immediately correct this disagreement. For example, if the pin conveyer 13 is ahead of the hook conveyer 11, the rotor of the motion transmitting device 25 will be angularly displaced with respect to the rotor of the motion transmitting device 27 and the result will be the appearance of an induced electromotive force on the differential motion receiving device 29 thereby causing the disk 35 to be rotated in a counterclockwise direction. The slot 51 is thereby moved so that light is directed on the light sensitive device 33. The resulting flow of current through the amplifier 31 causes the relay 52 to close its contacts thereby completing an energizing circuit for the direction switch 54. This switch in closing connects the field winding 19 to the source of supply so that excitation is produced on the motor 12 in a direction to cause the motor to slow down. If the disagreement between the conveyers is quite large the disk 35 will be rotated until the slot 56 will permit light to reach the light sensitive device 34, so that the relay 48 will be energized, and as explained above this relay will close its contacts to energize the relay 49 which operates to short circuit the field rheostat 43. Consequently the field excitation applied on the motor 12 is further increased to decelerate the motor 12. As the two conveyers come into positional agreement with each other the receiving device 29 returns the disk 35 to its original position and the relays 48 and 52 are successively deenergized so that the motor 12 resumes operation with the correct speed relation and positional relation with the conveyer 11 and the conveyer 13 established.

It will be understood of course that if the pin conveyer 13 lags behind the hook conveyer 11, the slots 38 and 46 will be brought into position to cause the energization of the direction switch 41 and the accelerating relay 49. In this case, however, the corrective field winding 19 applies excitation to the motor 12 in a direction to decrease the excitation on the motor. Consequently the motor increases its speed until the conveyers are brought into positional agreement and thereafter functions to maintain the conveyers in synchronism.

If it be desired to operate the pin conveyer in a reverse direction, the master switch 61 will be operated to its left-hand position. An energizing circuit is thereby completed for the direction switch 60 which operates to energize the armature of the motor 12 in a direction to cause it to drive the conveyer in the reverse direction. At the same time an energizing circuit is completed for the accelerating relays 62 and 63, each of which time closes to complete energizing circuits for the accelerating contactors 67 and 68.

When it is again desired to operate the conveyers in synchronism it is only necessary to move the master switch to its right-hand position, inasmuch as our system will automatically operate to bring the conveyers into positional agreement with each other.

Of course it will be understood by those skilled in the art that conducting segments may be substituted for the slots in the disk and cooperating conducting members used in lieu of the light sensitive devices so that the switches 41, 49 and 54 could be directly controlled. However, such contacts may impose considerable mechanical load on the motion receiving device 29 with detrimental effects on the accuracy of control.

While we have shown a particular embodiment of our invention, it will be understood of course, that we do not wish to be limited thereto, since many modifications may be made and we therefore contemplate by the appended claims to cover any modifications that fall within the true spirit and scope of our invention.

What we claim as new and desire to secure by Letters Patent of the United States is:

1. In a material conveying apparatus, the combination of a pair of conveyers one of which is arranged to receive material from the other when a given point on one conveyer is in a predetermined position with respect to a given point on the other conveyer, of driving means for each of said conveyers, control means for one of said driving means, and means responsive to the positional displacement between said conveyers for operating said control means so as to vary the speed of one of said conveyers until said given points are again in positional correspondence with each other.

2. Means for maintaining two continuously moving conveyers in positional agreement with each other, comprising a light source and a light sensitive device, and differential means responsive to a positional disagreement between said conveyers for varying the amount of light directed on said light sensitive device, and means responsive to said light sensitive device for varying the speed of one of said conveyers so as to bring said conveyer into positional agreement and thereafter maintain said conveyer in synchronism.

3. Means for maintaining two continuously moving objects in positional agreement one with the other comprising driving means for each of said objects, motion transmitting devices operatively connected to each of said driving means, a differential motion receiving device responsive to said motion transmitting devices, light sensitive means for temporarily varying the speed of one of said driving means and means responsive to the operation of said receiving device for controlling the illumination of said light sensitive means so that the speed of one of said driving means is temporarily varied until said objects are brought into positional agreement.

4. In combination with a pair of conveyers normally arranged to be operated with points of one conveyer in positional agreement with points on the other conveyer, of motors for driving each of said conveyers, a motion transmitting device for each of said conveyers, means for gearing each of said motion transmitting devices to its respective conveyer so that each of said motion transmitting devices is rotated one revolution by travel of its conveyer through a predetermined distance, a differential receiving device electrically connected to said motion transmitting devices, a light sensitive device controlled by said differential device for varying the speed of one of said driving means to bring said points of its conveyer into positional agreement with said points of the other conveyer.

5. In combination with at least two conveyers normally arranged to be operated with points on each conveyer in positional agreement with each other, of motors for driving each of said conveyers, motion transmitting devices for each of said conveyers, means for gearing each of said motion transmitting devices to its respective conveyer so that each of said motion transmitting devices is rotated one revolution by travel of its conveyer thru a distance equal to the distance between said respective points on said conveyers which are to be maintained in positional agreement, a differential receiving device electrically connected to said motion transmitting devices, a light sensitive device arranged to be controlled by the operation of said differential device for varying the speed of one of said motors until said conveyers are brought into positional agreement one with the other and means for deenergizing one of said driving motors and for energizing another of said motors for reverse operation.

6. In combination with a pair of conveyers of a reversible motor for driving one of said conveyers, a motor for driving the other of said conveyers, position transmitting means operatively connected to each of said conveyers, a differential receiving means electrically connected to said transmitting means, a light sensitive device arranged to increase the speed of one of said motors when a positional disagreement in one direction occurs, and a second light sensitive device for decreasing the speed of said motor when a positional disagreement in the other direction occurs, and a third light sensitive device arranged to augment the corrective effort of one or the other of said light sensitive devices whenever a predetermined positional disagreement occurs so that said conveyers are quickly brought into positions approaching correspondence and are thereafter slowly brought into positional agreement.

7. In combination with a pair of conveyers arranged to be operated with points of one conveyer in positional agreement with points of the other conveyer, of driving motors for each of said conveyers, speed control means for each of said motors, corrective speed control means for one of said motors, means for simultaneously operating said control means and said corrective control means, means responsive to positional disagreement between said conveyers for operating said corrective speed control means so as to increase or to decrease temporarily the speed of one of said conveyers until said points of said conveyers are operating in correspondence with each other.

8. In combination with a pair of conveyers arranged to be operated in positional agreement with each other, of driving motors for each of said conveyers, speed control means for each of said motors, corrective speed control means for applying a corrective effort to one of said motors means for simultaneously operating said speed control means and said corrective means so as to vary the speed of said conveyers and the magnitude of the corrective effect of said corrective means, means responsive to positional disagreement between said conveyers for controlling said corrective means comprising a plurality of light sensitive means for controlling the direction of application of said corrective effect by said corrective means, whereby said conveyers are brought into positional agreement and are thereafter maintained in synchronism.

In witness whereof, we have hereunto set our hands.

WILLIAM B. SNYDER.
DUDLEY E. CHAMBERS.